(12) United States Patent
Gibson et al.

(10) Patent No.: US 8,764,411 B2
(45) Date of Patent: Jul. 1, 2014

(54) METHODS AND SYSTEMS FOR ASSISTED DIRECT START CONTROL

(75) Inventors: Alex O'Connor Gibson, Ann Arbor, MI (US); Joseph Norman Ulrey, Dearborn, MI (US); Gregory Michael Pietron, Canton, MI (US); Seung-Hoon Lee, Northville, MI (US); Yuji Fujii, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 13/531,378

(22) Filed: Jun. 22, 2012

(65) Prior Publication Data

US 2012/0264567 A1 Oct. 18, 2012

Related U.S. Application Data

(63) Continuation of application No. 12/750,416, filed on Mar. 30, 2010, now Pat. No. 8,210,828.

(51) Int. Cl.
*B60W 10/113* (2012.01)
*F04B 49/20* (2006.01)

(52) U.S. Cl.
CPC .............. *B60W 10/113* (2013.01); *F04B 49/20* (2013.01)
USPC ................ 417/53; 417/223; 417/319; 475/72

(58) Field of Classification Search
CPC ............................ F04B 49/20; B60W 10/113
USPC ............. 477/77, 78; 903/915; 417/10, 15, 34, 417/53, 223, 319; 74/730.1, 731.1, 732.1, 74/733.1; 475/72
See application file for complete search history.

(56) References Cited

U.S. PATENT DOCUMENTS

| | | | | |
|---|---|---|---|---|
| 6,048,288 A | * | 4/2000 | Tsujii et al. ........................ | 477/5 |
| 6,093,974 A | | 7/2000 | Tabata et al. | |
| 6,656,083 B2 | * | 12/2003 | Esaki ................................. | 477/5 |
| 6,881,170 B2 | | 4/2005 | Onoyama et al. | |
| 6,942,594 B2 | | 9/2005 | Itoh et al. | |
| 2008/0139360 A1 | | 6/2008 | Hayashi et al. | |

* cited by examiner

*Primary Examiner* — Charles Freay
*Assistant Examiner* — Philip Stimpert
(74) *Attorney, Agent, or Firm* — Julia Voutyras; Alleman Hall McCoy Russell & Tuttle LLP (57) ABSTRACT

Methods and systems are provided for pressurizing a transmission hydraulic circuit including a transmission mechanical pump coupled to an engine though a gearbox. One example method comprises, during an engine start, adjusting a speed ratio between the transmission pump and the engine between a first speed ratio and a second speed ratio, the pump rotating faster relative to the engine at the first speed ratio as compared with the second speed ratio. In this way, the pump may be driven at different speed ratios relative to the engine to provide better pressurization in the transmission.

11 Claims, 7 Drawing Sheets

METHODS AND SYSTEMS FOR ASSISTED DIRECT START CONTROL

CROSS REFERENCE TO RELATED APPLICATIONS

The present application is a continuation of U.S. patent application Ser. No. 12/750,416 filed Mar. 30, 2010, the entire contents of which are incorporated herein by reference for all purposes.

FIELD

The present application relates to methods and systems for controlling an engine restart.

BACKGROUND AND SUMMARY

Vehicles have been developed to perform an automatic idle-stop when idle-stop conditions are met and to automatically restart the engine when restart conditions are met. Such idle-stop systems enable fuel savings, reduction in exhaust emissions, reduction in noise, and the like.

Following an engine idle-stop, pressure may be maintained in the hydraulic line to enable transmission and driveline functionality and to reduce engine restart times. Hydraulic line pressure may be maintained using, for example, auxiliary electric motor driven pumps, accumulators, etc., until the mechanical transmission pump reaches full flow capacity. However, the operation of an auxiliary electric pump during engine idle-stop may degrade fuel savings while increasing component costs. Similarly, the cost and time involved in recharging an accumulator following discharge at restart may limit the engine's ability to perform successive restarts.

Thus, in one example, some of the above issues may be addressed by a method of controlling a vehicle system including an engine and a transmission fluid pump driven by the engine. In one embodiment, the method comprises, during an engine start, adjusting a speed ratio between the engine and the transmission pump between a first speed ratio and a second speed ratio, the pump rotating faster relative to the engine at the first speed ratio as compared with the second speed ratio.

In one example, a transmission mechanical pump may be coupled to the engine through a gearbox, such as a variable gearbox including at least one gear set. The gearbox may further include a first electric clutch and a second one-way clutch. By adjusting the operation of the clutches, the mechanical pump may be coupled to the engine with a first gear set, such that the pump is driven at a first speed ratio, or with a second gear set, such that the pump is driven at a second speed ratio. The gear ratios of the gear sets may be such that the pump rotates faster relative to the engine at the first speed ratio than at the second speed ratio.

During engine start, when the engine speed is below a threshold (such as below 400 rpm), and transmission pump flow capacity may be limited, an engine controller may close the electric clutch so that the mechanical pump is coupled to the engine at the first gear ratio via the electric clutch and a first gear set, and the pump is temporarily operated at the first speed ratio. In one example, when operated at the first speed ratio, the transmission pump speed may be higher than the engine speed. For example, the gearbox may be a two-speed gearbox enabling a 1:1 and a 1:10 speed conversion. Herein, when the electric clutch is adjusted to temporarily operate the pump at the first speed ratio, the first gear ratio of the gearbox may enable the transmission pump to be operated at 400 RPM when the engine speed is 40 RPM, thereby improving the flow capacity of the transmission pump at the onset of the engine start operation. Then, once the engine has reached the threshold speed, the electric clutch may be opened so that the mechanical transmission pump is coupled to the engine at the second gear ratio via the one-way clutch and a second gear set, and the transmission pump is operated at the second speed ratio with full flow capacity. In one example, when the electric clutch is adjusted to temporarily operate the transmission pump at the second speed ratio, the second gear ratio of the gearbox may enable the pump to be operated at 400 RPM when the engine speed is also at 400 RPM.

By improving the flow capacity of the pump at the time of engine restart, pressurized transmission fluid may be delivered to the transmission, thereby enabling an early engagement of transmission clutches when a vehicle start and launch is requested. Furthermore, the need to maintain hydraulic line pressure with auxiliary transmission pumps, such as an electric pump, is substantially reduced. By reducing the need for auxiliary transmission pumps, substantial energy and fuel savings may be achieved without affecting restart times, and while also reducing component degradation due to prolonged auxiliary pump use.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
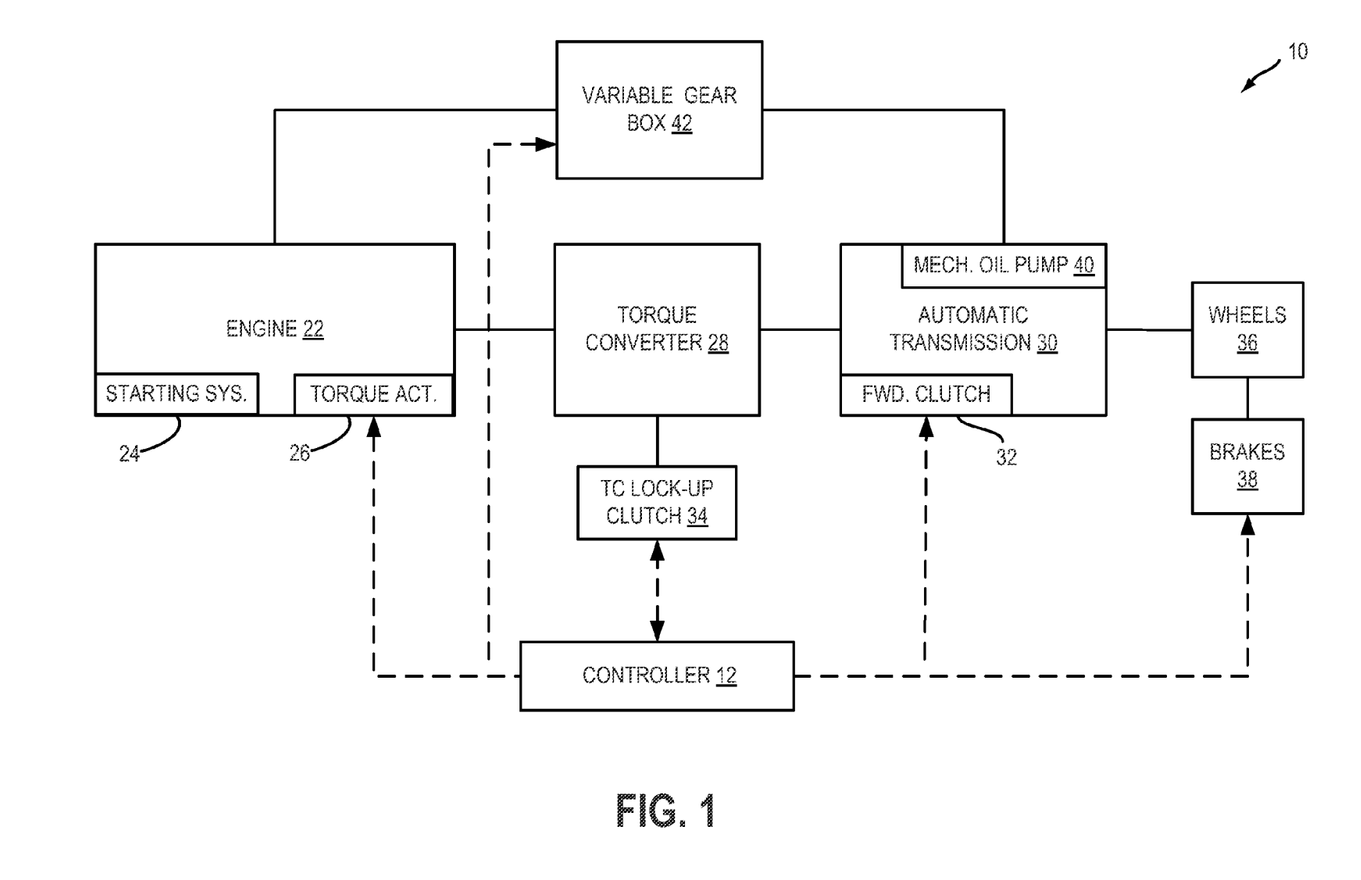
FIG. 1 shows an example vehicle system layout, including details of a vehicle drive-train.
Figure 7:
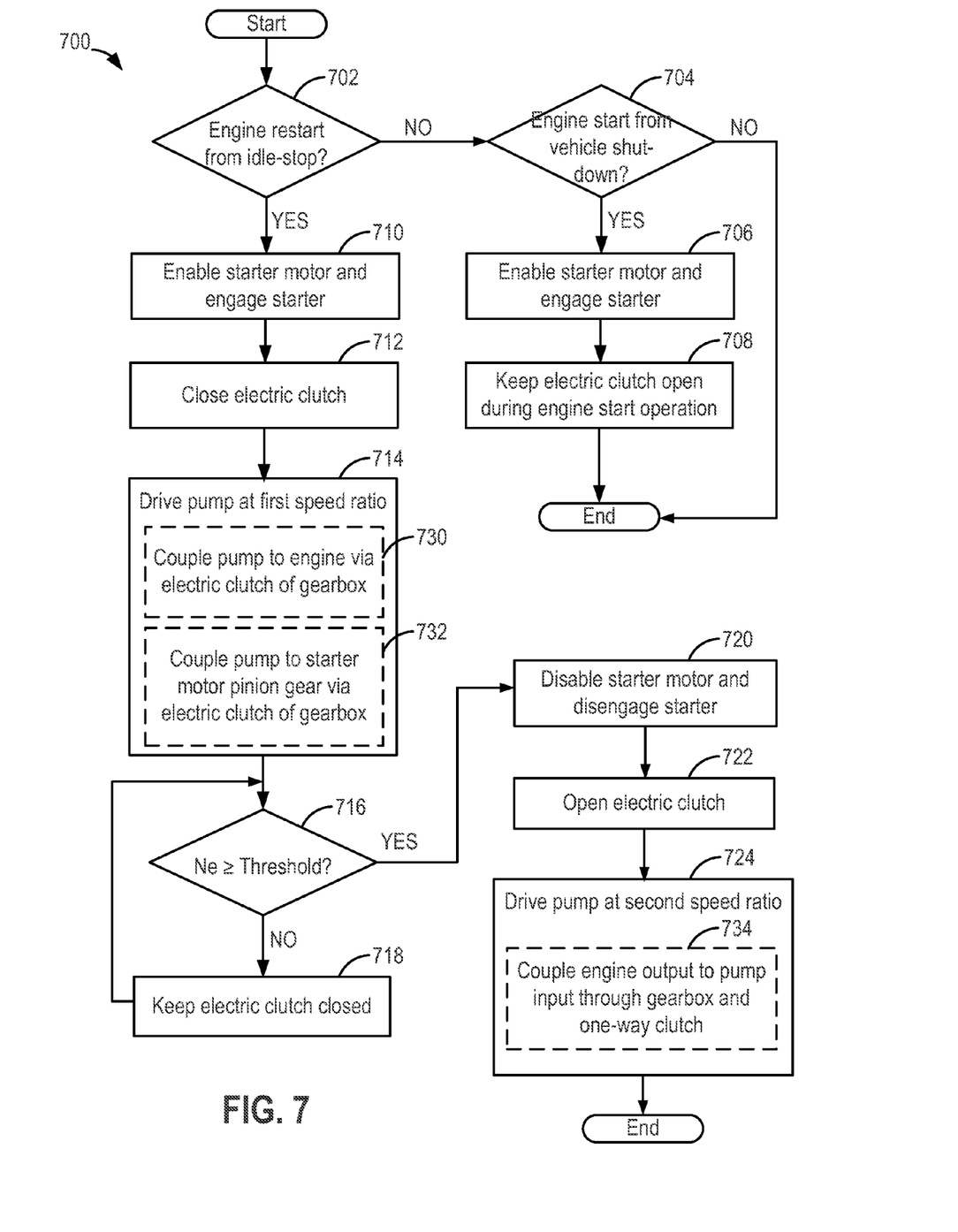
FIG. 7 shows a high level flow chart for executing a restart operation using the variable gear box of FIGS. 2-3, and 5-6.
Figure 8:
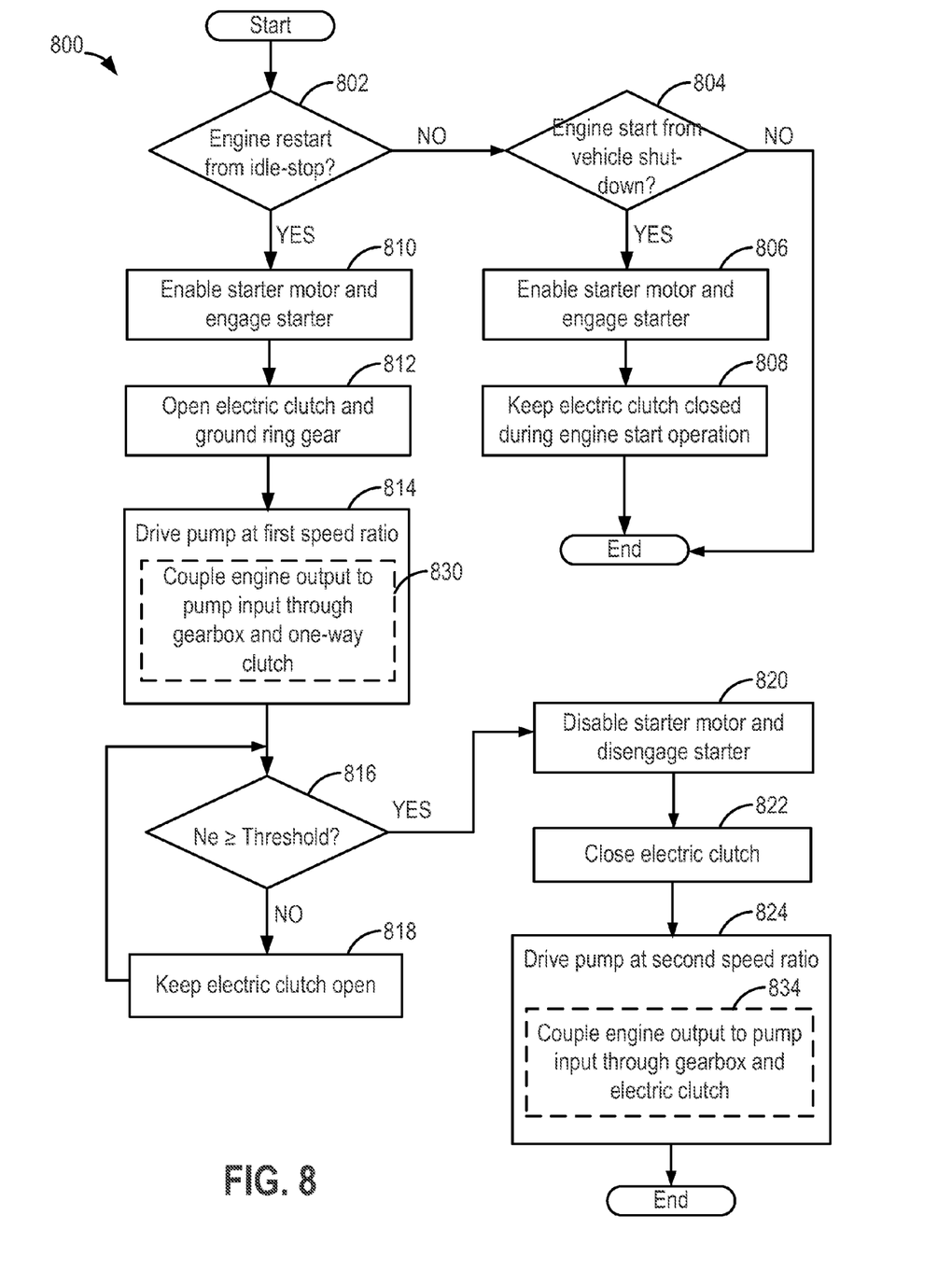
FIG. 8 shows a high level low chart for executing an engine start using the variable gear box of FIG. 4.
Figure 9:
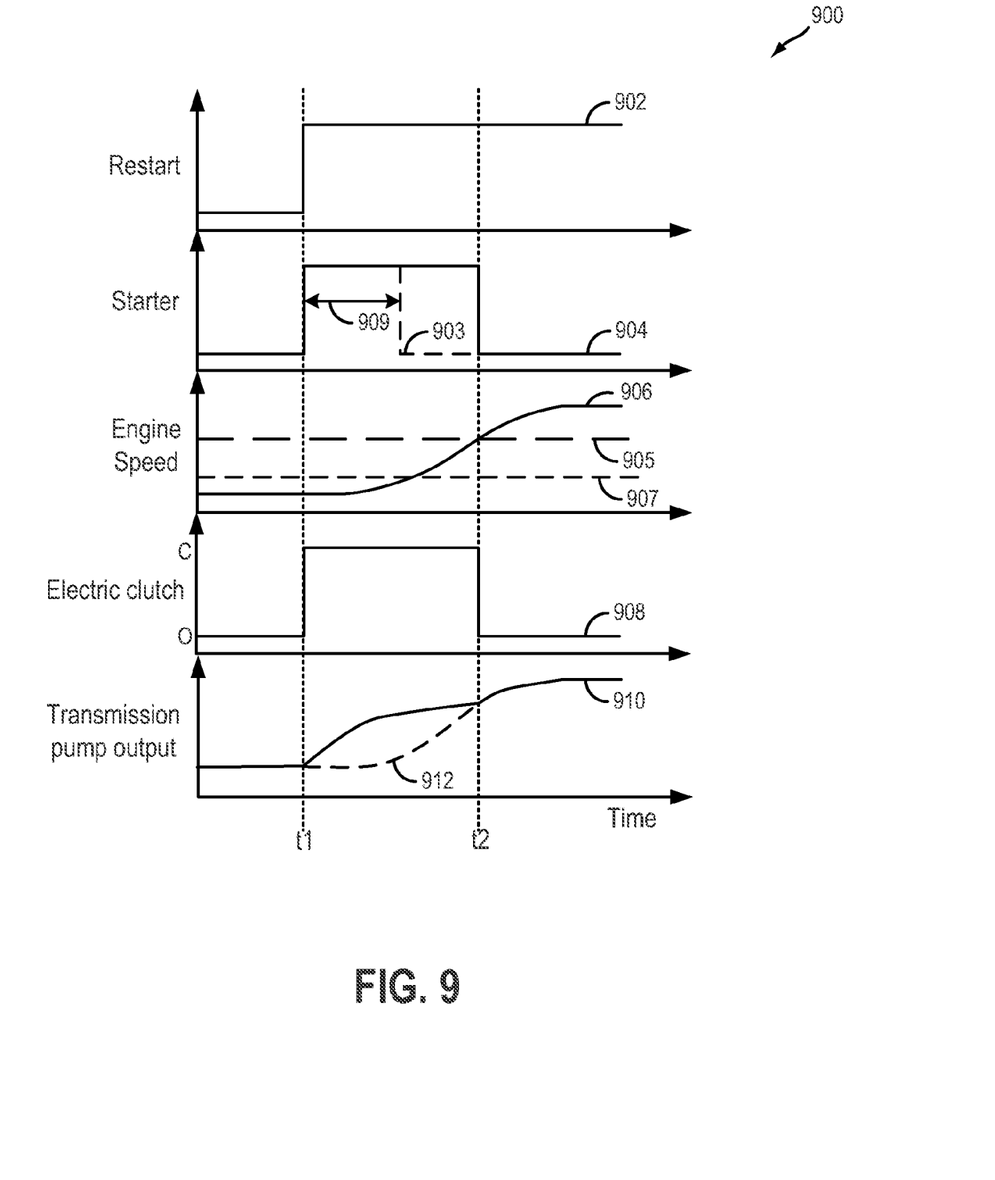
FIG. 9 shows a map with a plurality of graphs explaining an example engine start procedure, according to the present disclosure.

The following description relates to systems and methods for temporarily providing hydraulic line pressure at engine restart, while a transmission pump comes up to speed. As shown in FIG. 1, a vehicle system may be configured with a variable gear box to increase transmission pump flow at low engine speeds, when the transmission pump is not at full pumping capacity. During such conditions, the variable gear box may be used to temporarily operate the transmission pump at a higher speed ratio relative to the engine. The gear box may control pump flow via an electric clutch, as illustrated in FIGS. 2-6. Additionally, a one-way clutch may be included in the gearbox to maintain operation of a low speed input. An engine control system may be configured to perform control routines, such as illustrated in FIGS. 7-8, to adjust electric clutch operation at engine start and temporarily increase transmission pump flow at low engine speeds. Then, once the engine has reached a threshold speed at which transmission pump flow capacity is restored, the electric clutch may be adjusted to enable usual pump operation to resume. An example restart operation, using the variable gear box of FIG. 1, is illustrated in FIG. 9.

In this way, hydraulic line pressure may be maintained at, and just prior to, an engine start without necessitating operation of an auxiliary pump, such as a constantly running electric pump or a variable displacement pump with a large displacement range. However, an auxiliary transmission pump may be included if desired. By reducing the operation of auxiliary transmission pumps, component and cost savings may be achieved without affecting the quality of engine restarts.

FIG. 1 is a block diagram of a vehicle drive-train 10. Drive-train 10 may be powered by engine 22. In one example, engine 22 may be a gasoline engine. In alternate embodiments, other engine configurations may be employed, for example a diesel engine. Engine 22 may be started with an engine starting system 24, including a starter motor. Engine 22 may also include an auxiliary starter system (not shown) to support engine restart at near zero engine speed, for example at 50 RPM. Further, engine 22 may generate torque via torque actuator 26, such as a fuel injector, throttle, etc. Engine 22 may be selectively and automatically deactivated and shut-down during engine idle-stop conditions (e.g., by shutting off fuel and/or spark). Engine 22 may also be selectively and automatically restarted during restart from idle-stop conditions.

An engine output torque may be transmitted to torque converter 28 to drive an automatic transmission 30 by engaging one or more hydraulically actuated transmission components, or clutches, including one or more forward clutch(es) 32. As such, a plurality of such hydraulically actuated transmission components or clutches may be engaged, as needed. The output of the torque converter may, in turn, be controlled, in part, by torque converter lock-up clutch 34. As such, when torque converter lock-up clutch 34 is fully disengaged, torque may be transmitted from torque converter 28 to automatic transmission 30 in relation to engine speed. In contrast, when torque converter lock-up clutch 34 is fully engaged, the entire engine output torque may be relayed to an input shaft (not shown) of transmission 28. Alternatively, the torque converter lock-up clutch 34 may be partially engaged, thereby enabling the amount of torque relayed to the transmission to be adjusted.

Torque output from the automatic transmission 30 may in turn be relayed to wheels 36 to propel the vehicle. Specifically, automatic transmission 30 may adjust an input driving force along the input shaft (not shown) responsive to a vehicle traveling condition before transmitting an output driving force to the wheels. As such, speed of wheels 36 may be reduced by engaging wheel brakes 38 while torque is applied to the transmission input. In one example, wheel brakes 38 may be engaged in response to the operator pressing his foot on a brake pedal (not shown). In the same way, wheel speed 36 may be conserved by disengaging wheel brakes 38 in response to the operator releasing his foot from the brake pedal.

A mechanical transmission oil pump 40 may be hydraulically coupled to engine 22 and to automatic transmission 30 to provide hydraulic pressure to engage forward clutch 32. Transmission pump 40 may be operated in accordance with torque converter 28, and may be driven by engine 22. Consequently, the flow capacity of transmission pump 40 may be limited early on during an engine restart process, and during an engine shut-down. A variable gearbox 42 may be configured to couple engine 22 to mechanical pump 40. Variable gearbox 42 may include at least one gear set with one or more gears. As elaborated herein, the flow capacity of the transmission pump 40 may be temporarily increased at the onset of an engine start (or restart) process using variable gear box 42 included between engine 22 and transmission pump 40.

During an engine start operation, such as an engine restart from idle-stop operation, controller 12 may adjust gear box 42 to thereby adjust a speed ratio between the transmission pump 40 and engine 22 between at least a first speed ratio and a second speed ratio, wherein the pump rotates faster relative to the engine at the first speed ratio as compared with the second speed ratio. The controller may select between the first and second speed ratio in response to engine speed. In one example, as elaborated herein, the selection may include, driving the pump at the first speed ratio when the engine speed is below a threshold (such as, during engine cranking), and driving the pump at the second speed ratio when the engine speed is above the threshold (such as, during engine operation following cranking).

By temporarily operating the pump at the first speed ratio, and thereby increasing the pump output at engine start, hydraulic line pressure may be increased and maintained until the engine reaches a threshold speed and the transmission pump can resume full flow capacity. As a result, the need for auxiliary pumps, such as a motor driven electric pump, may be reduced. By maintaining hydraulic line pressure, a swift and early re-engagement of clutches may be enabled during the engine start. It will be appreciated that, while not depicted, a variety of reduction gears may be additionally included between the engine and the gearbox and/or between the gearbox and the pump.

Controller 12 may also be configured to receive inputs from engine 22 and accordingly control a torque output of the engine. For example, a torque output may be controlled by adjusting torque actuator 26. This may include adjusting a combination of spark timing, fuel pulse width, fuel pulse timing, and/or air charge, by controlling throttle opening and/or valve timing, valve lift, and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also adjust the torque output from transmission 30 by adjusting the engagement state of one or more of the transmission clutches, such as forward clutch 32.

Figure 2:
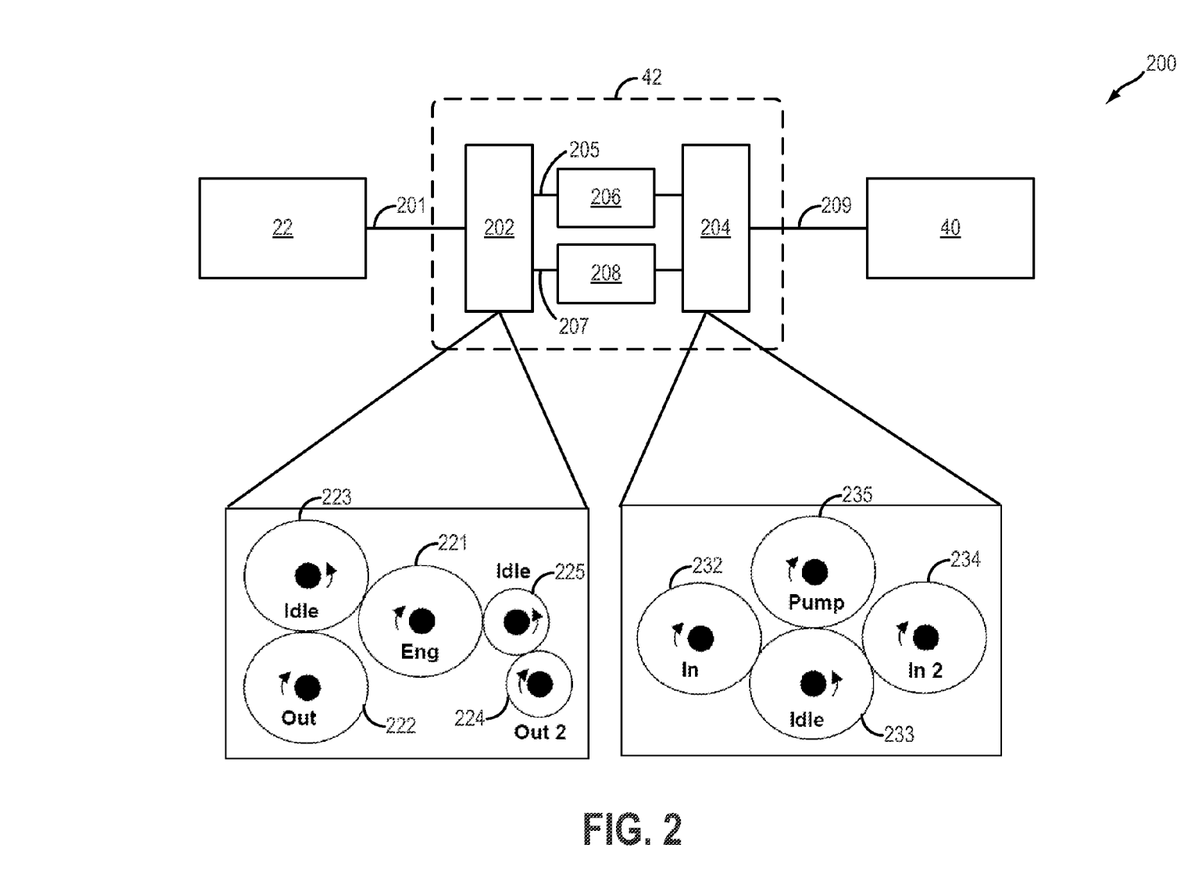
FIGS. 2-4 show example embodiments of a variable gear box for operating the transmission pump of FIG. 1 at low engine speeds.
Figure 3:
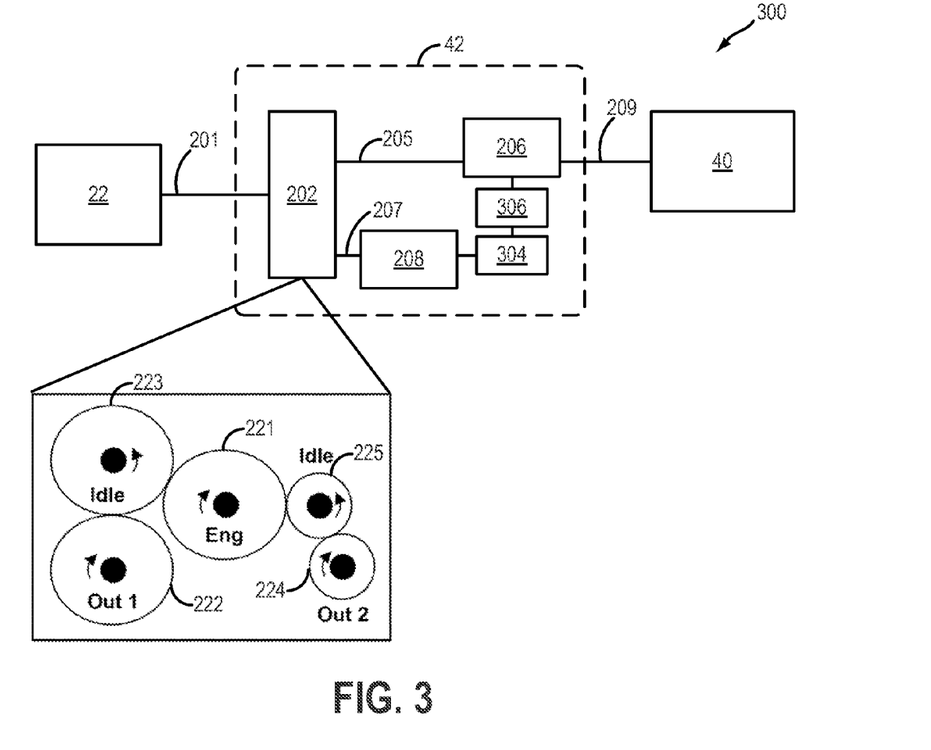
Figure 4:
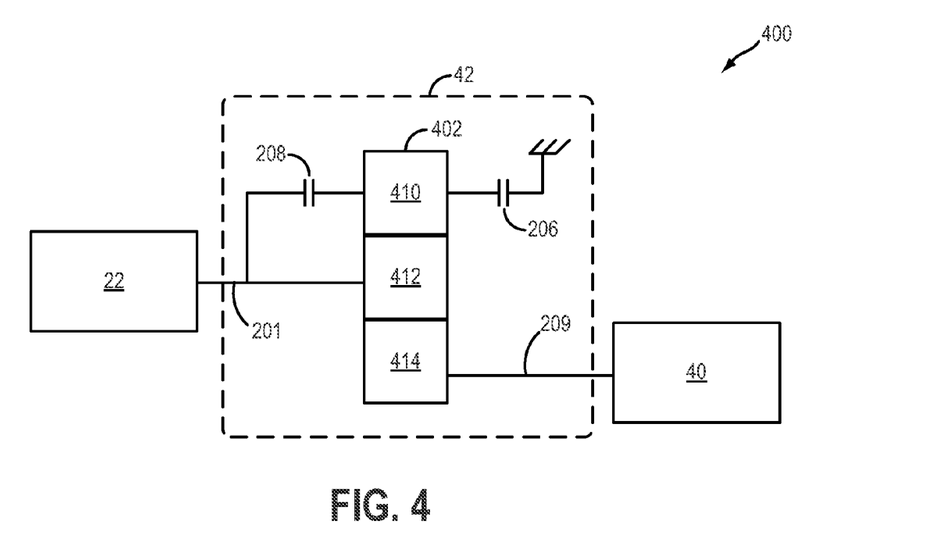
Figure 5:
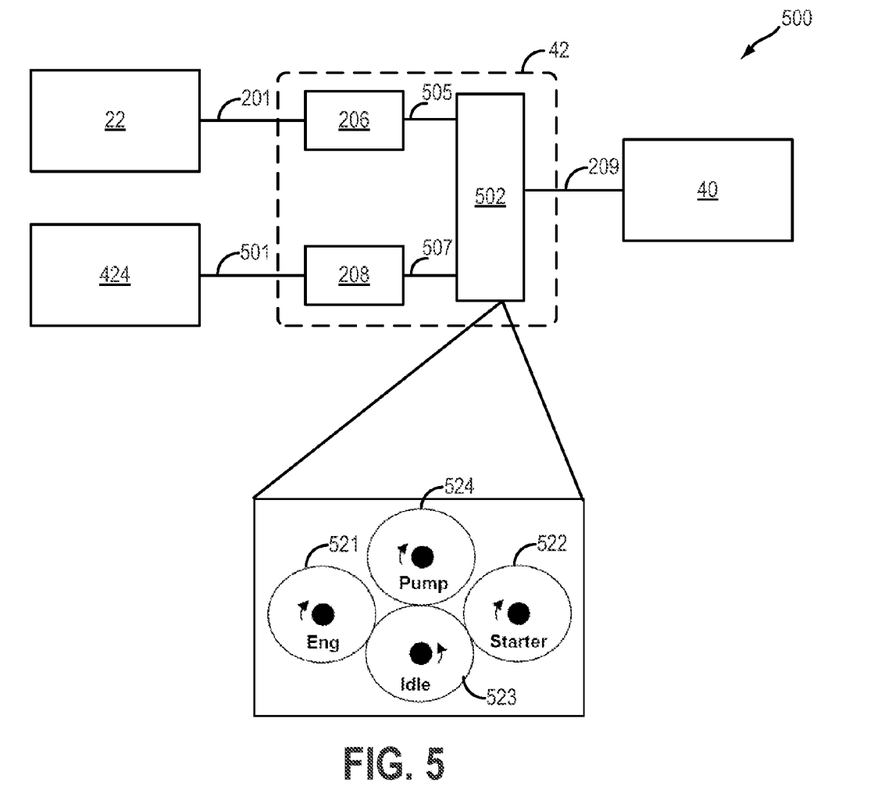
FIGS. 5-6 show example embodiments of a starter motor operated variable gear box for operating the transmission pump of FIG. 1 at low engine speeds.
Figure 6:
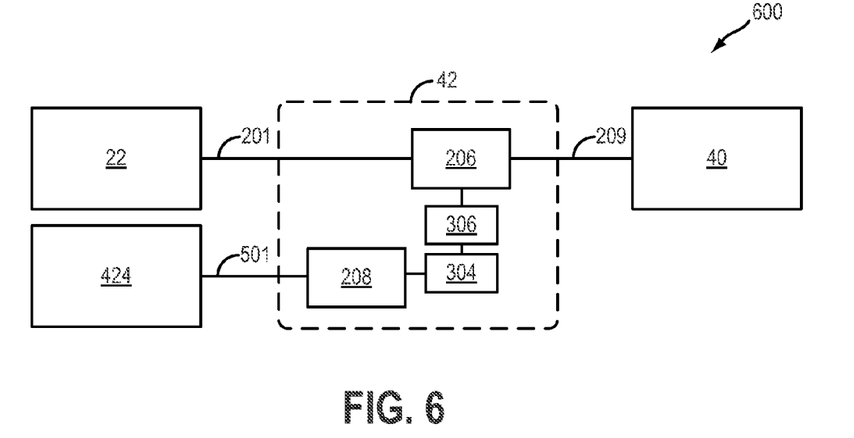

FIGS. 2-6 depict alternate embodiments of the variable gearbox 42 of FIG. 1 for operating the transmission pump at low engine speeds. Specifically, FIGS. 2-4 depict alternate embodiments of the variable gearbox coupled to, and driven by, the engine of FIG. 1, while FIGS. 5-6 depict alternate embodiments of the variable gearbox coupled to, and driven by, the starting system of the engine of FIG. 1. It will be appreciated that components introduced in FIG. 2 may be similarly numbered in FIGS. 3-6, and may not be reintroduced for reasons of brevity.

FIG. 2 illustrates a first embodiment 200 of the variable gearbox system of FIG. 1. Gearbox 42 may be included between transmission pump 40 and engine 22. In one example, as depicted, variable gearbox 42 may be a two-speed gearbox configured to couple and drive transmission pump 40 with engine 22 at each of a first speed ratio and a second speed ratio. For example, the first speed ratio may be higher than the second speed ratio. Gearbox 42 may include at least one gear set. For example, as depicted, gearbox 42 may include a first gear set 202 and a second gear set 204, the gear sets coupled through each of a one-way clutch 206 and an electric clutch 208. Specifically, first gear set 202 may be coupled to the second gear set 204 via one-way clutch 206 along a first path 205 and via electric clutch 208 along a second path 207, the second path 207 disposed parallel to the first path 205. By adjusting the operation of the electrically operated clutch (208), pump 40 may be coupled to engine 22 through the first gear set or the second gear set so that pump 40 may be driven by engine 22 at a first speed ratio or a second speed ratio. Additional reduction gears may be optionally included between the engine and the gearbox and/or between the gearbox and the pump.

Each of first gear set 202 and second gear set 204 may include one or more gears. In one example, as depicted, first gear set 202 may include an input gear 221, a first output gear 222, a second output gear 224, a first idler gear 223, and a second idler gear 225. Input gear 221 may be driven by engine 22 via engine output shaft 201. The rotation of input gear 221 may be coupled to first output gear 222 via first idler gear 223 and to second output gear 224 via second idler gear 225. The ratio of the diameters of the gear sets may determine the corresponding gear ratios. In one example, as depicted, second output gear 224 may have a smaller diameter than input gear 221, thereby enabling a gear reduction and a corresponding increase in speed, the increase in speed based on the corresponding gear ratio.

Second gear set 204 may include a first input gear 232, a second input gear 234, an output gear 231, and an idler gear 233. First input gear 232 may be configured to receive a rotational input from first output gear 222 along first path 205 when one-way clutch 206 is closed. Similarly, second input gear 234 may be configured to receive a rotational input from second output gear 224 along second path 207 when electric clutch 208 is closed. Each of first input gear 232 and second input gear 234 may be coupled to output gear 231 through idler gear 233. Output gear 231 of second gear set 204 may be used to drive pump 40 via pump input shaft 209. In one example, first gear set 202 may have a first, higher gear ratio and the second gear set may have a second, lower gear ratio.

During an engine start, controller 12 may be configured to adjust electric clutch 208 of gearbox 42 responsive to engine speed to thereby selectively couple pump 40 to engine 22 at each of a first and second gear ratio, and correspondingly drive the pump at each of a first and second speed ratio. Specifically, upon engine start, the controller may, at first, temporarily drive the pump at the first speed ratio. Then, the controller may adjust the output of the gear box from the first speed ratio to the second speed ratio. As such, the pump may rotate faster relative to the engine at the first speed ratio as compared with the second speed ratio. As elaborated in FIGS. 7-9, when the engine speed is below the threshold, controller 12 may adjust electric clutch 208 to couple pump 40 to engine 22 through the gearbox at a first, higher, gear ratio via (first) electric clutch 208 to drive the pump at the first speed ratio. Then, when the engine speed is above the threshold, the controller may adjust the electric clutch 208 to couple pump 40 to engine 22 through the gearbox at the second, lower, gear ratio via (second) one-way clutch 206 to drive the pump at the second speed ratio.

As such, engine 22 may drive input gear 221 which may in turn rotate first output gear 222 and second output gear 224. Due to the differences in gear size, second output gear 224 may rotate faster while first output gear 222 rotates slower. Thus, when electric clutch 208 is closed, the faster rotating second output gear 224 is coupled to second input gear 324 which may in turn drive pump input shaft 209 at the higher speed. At the same time, since one-way clutch 206 is open, substantially no torque may be transferred from first output gear 222 to first input gear 322. Rather, one-way clutch may overrun at the speed of the first output gear. Consequently, a first, higher, gear ratio may be achieved between the pump and the engine, and the pump may be driven at the corresponding first speed ratio.

In comparison, when electric clutch 208 is opened, no torque is transferred from second output gear 224 to second input gear 324. Instead, the idler gear may overrun. At the same time, since one-way clutch 206 is closed, torque may be transferred from first output gear 222 to first input gear 322 which may in turn drive pump input shaft 209. Consequently, a second, lower, gear ratio may be achieved between the pump and the engine, and the pump may be driven at the corresponding second speed ratio.

In one example, the gear sets of the gearbox may enable a 1:1 and a 1:10 speed conversion. Thus, at low engine speeds, for example at 40 RPM, when the electric clutch is closed and the pump is driven at the first speed ratio, the pump may be driven at 400 RPM while the engine runs at 40 RPM. At higher engine speeds, for example at 400 RPM, when the electric clutch is opened, the pump may be driven at 400 RPM while the engine runs at 400 RPM. Additionally, the adjustment of the gearbox may be coordinated with an engine start operation. For example, the adjustment may include operating the gearbox and driving the pump at the first speed ratio when an engine starter is engaged, and operating the gearbox and driving the pump at the second speed ratio when the engine starter is disengaged.

FIG. 3 illustrates an alternate embodiment 300 of variable gearbox 42. Herein, the second gear set of FIG. 2 is replaced with a fixed gear 304 and an idler gear 306. Thus, when electric clutch 208 is closed, the higher torque of second output gear 224 may be transmitted to pump 40 along pump input shaft 209 via fixed gear 304 and idler gear 306. In comparison, when electric clutch 208 is open, the lower torque of first output gear 222 may be transmitted to the pump input shaft via one-way clutch 206.

FIG. 4 illustrates another alternate embodiment 400 of variable gearbox 42. Herein, variable gearbox 42 may include a planetary gear set 402 including a ring gear 410, a carrier gear 412, and a sun gear 414. Engine 22 may be coupled to ring gear 410 of planetary gear set 402 through electric clutch 208 while pump 40 is coupled to sun gear 414 through one-way clutch 206. Herein, during an engine start, when engine speed is below the threshold, engine controller 12 may temporarily open electric clutch 208 while using one-way clutch 206 to ground ring gear 410 of the planetary gear set. By grounding the ring gear, pump 40 may be temporarily operated at the first speed ratio. Then, once the engine speed has risen above the threshold, electric clutch 208 may be closed, stopping ring gear grounding, and enabling pump 40 to be driven by the engine at the second speed ratio. For example, when the electric clutch is closed, the gear set may have a gear ratio of one to one. Then, when the electric is open, the gear set may have a gear ratio of one to $(N_R+N_S)/N_S$, where $N_R$ is the number of ring gear teeth while $N_S$ is the number of sun gear teeth.

FIG. 5 depicts yet another alternate embodiment 500 of variable gearbox 42 wherein the gearbox is coupled to the starting system of engine 22. As shown, gearbox 42 includes a gear set 502 with a first gear ratio. Gear set 502 may be coupled to engine 22 (and not to starting system 24) along first path 505 via one-way clutch 206. Gear set 502 may also be coupled to a starter motor of starting system 24 (FIG. 1) along second path 507 via electric clutch 208. Gear set 502 may include a first input gear 521 driven by engine 22 along engine output shaft 201. Gear set 502 may further include a second input gear 522 driven by a starter motor pinion gear (not shown) of engine starting system 24 along starter output shaft 501. Each of the first and second input gears 521, 522 may be coupled to an output gear 524 via idler gear 523. Output gear 524 may transfer torque to pump 40 along pump input shaft 209.

During an engine start, when the engine speed is below the threshold, a starter motor 424 of starting system 24 (FIG. 1) may be enabled to engage the starter and crank the engine. Engine controller 12 may be configured to close electric clutch 208 in coordination with starter engagement. When electric clutch 208 is closed, second input gear 522 may be coupled to the output of the starter motor pinion gear. As such, the starter motor pinion gear may have a smaller diameter than second input gear 522, enabling a first (higher) gear ratio to be achieved. The starter motor based torque may then be transferred from second input gear 522 to output gear 524, which may then drive transmission pump 40 at the first speed ratio. At the same time, one-way clutch 206 may be open. Thus, substantially no torque may be transferred from first input gear 521 to the transmission pump. Rather, one-way clutch 206 may overrun at the speed of the first input gear.

Once the engine speed has reached a threshold, the starter motor may be disabled and the starter may be disengaged. Engine controller may open electric clutch 208 in coordination with starter disengagement. When electric clutch 208 is opened, substantially no torque may be transferred through second input gear 522. Since one-way clutch 206 may be closed at this time, torque may be transferred from the engine output shaft 201 to first input gear 521 and thereon to pump input shaft 209. Consequently, the engine based torque may be used to drive pump 40 at the second speed ratio.

Now turning to FIG. 6, it depicts an alternate embodiment 600 of variable gearbox 42 coupled to the starting system of engine 22. Here, as in FIG. 3, the gear set of FIG. 5 is replaced with a fixed gear 304 and an idler gear 306. Thus, when electric clutch 208 is closed during an engine start, transmission pump 40 is driven by the starter motor torque at the first speed ratio, and when the electric clutch 208 is opened, transmission pump 40 is coupled to the engine through one-way clutch 206, and driven by the engine torque at the second speed ratio.

Now turning to FIG. 7, an example routine 700 is depicted for performing an engine start operation using a variable gearbox, such as the variable gearbox of FIGS. 2-3, and 5-6, to temporarily increase hydraulic line pressure and transmission pump flow capacity at start. Herein, the engine start operation may include, as one example, an automatic engine restart from idle-stop conditions. The engine may be automatically restarted due to engine operating conditions falling outside a desired range, for example, due to a battery state of charge falling below a threshold, or an air condition air compressor pressure dropping below a desired level. In another example, the engine start operation may include an engine start from a vehicle shut-down condition in response to an operator's request to start the engine and launch the vehicle. In yet another example, the engine start operation may include an engine start from an alternate condition, such as, an engine cold start.

At 702, it may be determined whether an engine restart from idle-stop conditions is present. This may include, for example, an automatic engine restart in response to an engine operating condition falling outside desired parameters, such as a vehicle battery state of charge falling below a threshold, an air conditioner compressor air pressure dropping below a threshold pressure, engine and/or catalyst temperature falling outside a desired temperature range, etc. Alternatively, an engine restart from idle-stop may be confirmed in response to a vehicle restart and re-launch request by the operator. If an engine restart from idle-stop is not confirmed, then at 704, it may be determined whether an engine start from vehicle shut-down condition has been satisfied. This may include receiving a request from the operator to start the engine (for example, perform a cold-start) and operate the vehicle. If an engine start condition is not confirmed, the routine may end.

If an engine start from vehicle shut-down is confirmed, at 706, the engine controller may enable the starter motor of the engine starting system and engage the starter to apply a cranking torque on the engine. Additionally, at 708, an electric clutch of the gearbox may be kept open during the engine start operation. Herein, the electric clutch may be configured to be closed upon starter activation, and remain open at least until the starter is deactivated. As such, during the engine start from vehicle shut-down, the idle-stop/restart functionality may not be desired. Alternatively, the engine start from vehicle shut-down may be performed during conditions when the idle-stop/restart functionality of the engine is restricted. In either case, maintenance of hydraulic line pressure for controlling transmission clutches and the like prior to engine start may not be necessitated. Thus, under such conditions, by keeping the electric clutch open (that is, inactivated) during the engine start, energy consumption may be reduced, and fuel economy benefits may be achieved.

If an engine restart from idle-stop is confirmed, at 710, the engine controller may enable the starter motor of the engine starting system and engage the starter to apply a cranking torque to the engine. At 712, the electric clutch of the variable gearbox may be temporarily closed (that is, activated). At 714, by adjusting the electric clutch, the transmission mechanical pump may be temporarily driven at a first speed ratio. Herein, driving the transmission pump at the first speed ratio may include, for example at 730, coupling the pump (e.g., pump input shaft) to the engine (e.g., engine output shaft) via the electric clutch of the gearbox. Alternatively, when the gearbox is coupled to a starter motor of the engine, driving the transmission pump at the first speed ratio may include, for example at 732, coupling the transmission pump (e.g., pump input shaft) to the engine starter motor's pinion gear (e.g., starter output shaft) via the electric clutch of the gearbox. As such, the gearbox may be operated at a first, higher, gear ratio to enable the transmission pump to be driven at the first speed ratio.

At 716, engine speed may be estimated and it may be determined whether engine speed has reached a threshold speed (for example, 400 rpm). As such, the designated threshold speed may reflect a speed above which the transmission pump's flow capacity may not be restricted, and the transmission pump may operate at full flow. Thus, above the threshold speed, the transmission pump may be able to maintain hydraulic line pressure without assistance from the gearbox. If the threshold speed has not been attained, at 718, the electric clutch may remain closed and the transmission pump may continue to be driven at the first pump ratio.

As such, at the onset on engine cranking, the engine speed may be assumed to be below the threshold speed and the electric clutch may be closed in coordination with starter engagement (for example, at the same time as starter engagement, or a predefined, short, time following starter engagement). However, it will be appreciated that in alternate embodiments, engine speed conditions may be estimated and/or monitored following starter engagement, and the electric clutch may be closed based on the engine speed (for example, when the engine speed is above a minimum threshold speed but below a maximum threshold speed).

Once engine speed has reached the threshold speed, at 720, the starter motor may be disabled and the starter may be disengaged. At 722, the electric clutch of the variable gearbox may be opened (that is, deactivated). At 724, by adjusting the electric clutch, the transmission mechanical pump may be driven at a second speed ratio. As such, the transmission pump may rotate faster relative to the engine in the first speed ratio as compared to the second speed ratio. Driving the transmission pump at the second speed ratio may include, for example at 734, coupling the transmission pump (e.g., pump input shaft) to the engine (e.g., engine output shaft) via the one-way clutch of the gearbox. Herein, the gearbox may be operated at a second, lower, gear ratio to enable the transmission pump to be driven at the second speed ratio.

While the depicted routine illustrates disengaging the starter and opening the electric clutch at the same threshold speed, it will be appreciated that in alternate embodiments, starter disengagement and electric clutch opening may occur at different threshold speeds. Thus, in one example, electric clutch opening and starter disengagement may be substantially coordinated, while in another example, electric clutch opening may lag behind starter disengagement.

In this way, pump operation at restart may be adjusted based on engine speed and further based on the nature of the restart. Thus, during a first engine restart from idle-stop condition, when hydraulic line pressure is desired to keep one or more transmission clutches engaged prior to restart, the transmission pump may be temporarily driven at a first speed ratio between the engine and the pump before adjusting the first ratio to a second speed ratio, with the pump rotating faster relative to the engine at the first speed ratio as compared to the second speed ratio. In comparison, during a second engine start from vehicle shut-down condition, when hydraulic line pressure maintenance and clutch engagement prior to engine restart is not required, the pump may be driven at the second speed ratio, and may not need to be coupled to the engine through the gearbox and driven at the first speed ratio.

Now turning to FIG. 8, an example routine 800 is depicted for performing an engine start operation using a variable gearbox including a planetary gear system, such as the variable gearbox of FIG. 5, to temporarily increase hydraulic line pressure and pump flow capacity at start.

At 802 (as at 702), it may be determined whether an engine restart from idle-stop conditions is present. If an engine restart from idle-stop is not confirmed, then at 804 (as at 704), it may be determined whether an engine start from vehicle shut-down conditions has been satisfied. If an engine start from vehicle shut-down is confirmed, at 806, the starter motor of the engine starting system may be enabled and the starter may be engaged to apply a cranking torque on the engine. At 808, the electric clutch of the gearbox may be kept closed during the engine start operation. Herein, the electric may be configured to be opened upon activation, and remain closed when deactivated. By keeping the electric clutch closed (that is, inactivated) during the engine start, energy consumption may be reduced, and fuel economy benefits may be achieved.

If an engine restart from idle-stop is confirmed, at 810, the engine controller may enable the starter motor of the engine starting system and engage the starter to apply a cranking torque to the engine. At 812, the electric clutch of the variable gearbox may be temporarily opened (that is, activated) and the ring gear of the gearbox may be grounded using the one-way clutch. At 814, by adjusting the electric clutch and grounding the ring gear, the transmission mechanical pump may be temporarily driven at the first speed ratio. Herein, driving the transmission pump at the first speed ratio may include, for example at 830, coupling the transmission pump (e.g., pump input shaft) to the engine (e.g., engine output shaft) via the one-way clutch of the gearbox. As such, the gearbox may be operated at a first, higher, gear ratio to enable the transmission pump to be driven at the first speed ratio.

At 816, engine speed may be estimated and it may be determined whether engine speed has reached a threshold speed (for example, 400 rpm). If the threshold speed has not been attained, at 818, the electric clutch may remain open and the transmission pump may continue to be driven at the first pump ratio. Once engine speed has reached the threshold speed, at 820, the starter motor may be disabled and the starter may be disengaged. At 822, the electric clutch of the variable gearbox may be closed (that is, deactivated). At 824, by adjusting the electric clutch, the transmission mechanical pump may be driven at a second speed ratio. As such, the transmission pump may rotate faster relative to the engine in the first speed ratio as compared to the second speed ratio. Driving the transmission pump at the second speed ratio may include, for example at 834, coupling the pump (e.g., pump input shaft) to the engine (e.g., engine output shaft) via the electric clutch of the gearbox. Herein, the gearbox may be operated at a second, lower, gear ratio to enable the pump to be driven at the second speed ratio.

While the depicted routine illustrates disengaging the starter and closing the electric clutch at the same threshold speed, it will be appreciated that in alternate embodiments, starter disengagement and electric clutch closing may occur at different threshold speeds. Thus, in one example, electric clutch closing and starter disengagement may be substantially coordinated, while in another example, electric clutch closing may lag behind starter disengagement.

FIG. 9 depicts map 900 with a plurality of graphs depicting an example restart from idle-stop operation according to the present disclosure. In FIG. 9, graph 902 indicates an engine restart status. Graph 904 depicts the engagement status of an engine starter. Graph 906 depicts the engine speed profile responsive to the restart operation. Graph 908 depicts the status of an electric clutch of the variable gearbox of FIG. 1. Graph 910 depicts the output of a transmission mechanical pump.

At $t_1$, as shown by graph 902, an engine restart from idle-stop request may be confirmed (for example, by confirming restart conditions) and an engine restart operation may be initiated. In response to the engine restart request, at $t_1$, as shown by graph 904, a starter of the engine's starting system may be engaged. This may include, activating a starter motor and engaging a pinion gear of the starter with the engine. In accordance with starter engagement, engine speed (as depicted by graph 906) may start to slowly rise as the engine spins-up and may reach threshold speed 905 only at $t_2$. In the absence of any assistance from the variable speed gearbox, the pump output (as depicted by graph 910) may also slowly rise responsive to the engine speed rise pattern. Threshold 905 may reflect an engine speed above which the transmission pump may operate with full flow capacity. Thus, between $t_1$ and $t_2$, when the engine's speed is below the threshold, the pump's flow capacity may be restricted, as shown by dotted line 912. This limited transmission pump flow capacity may reduce, or substantially limit, the selectively deactivatable/reactivatable engine's idle-stop/restart functionality. For example, in the absence of sufficient pump flow capacity, hydraulic line pressure may not be maintained, and consequently, the engagement state of one or more transmission clutches may not be modulated during the idle-stop and/or just before engine restart. Thus, an automatic engine restart or idle-stop operation may be delayed or constrained.

In comparison, by using assistance from the variable speed gearbox, the transmission pump's flow capacity may be improved between $t_1$ and $t_2$, as shown in graph 910. Specifically, when the engine speed is below threshold speed 905, engine controller may adjust the variable gearbox, in coordination with starter engagement at $t_1$, and close the electric clutch (as shown in graph 908). In one example, the electric clutch may be closed by activating a clutch solenoid. However, it will be appreciated that in alternate examples, the electric clutch may have a different configuration and may be closed upon deactivation of the solenoid.

By closing the electric clutch, an input shaft of the transmission pump may be coupled to an engine's output shaft, through the electric clutch of the variable gearbox, at a first gear ratio (as determined by the relative diameters of the gearbox's gear sets), and the transmission pump may be driven by the engine at a first speed ratio. In one example, the speed ratio may be 1:10. Consequently, when the engine speed is 40 rpm, the pump speed may be increased to 400 rpm (assuming no additional reduction gears are included).

At $t_2$, when the engine has reached threshold speed 905, the engine starter may be disengaged from the engine (as shown in graph 904). This may include, deactivating the starter motor and disengaging the pinion gear of the starter with the engine. Additionally, the electric clutch may be opened (as shown in graph 908), for example by deactivating a clutch solenoid. While the example depicts coordinating electric clutch closing with starter disengagement, in response to engine speed reaching threshold speed 905, it will be appreciated that in alternate examples, starter disengagement and electric clutch opening may have a lag. For example, the starter disengagement and electric clutch opening may be performed at different threshold speeds. For example, starter disengagement may occur at a point before $t_2$ (as shown by dashed line 903) when engine speed is at a lower threshold speed 907. Additionally, or optionally, starter disengagement may be time-dependent, such that starter disengagement may occur after $t_1$, and before $t_2$, when a duration 909 since starter engagement has elapsed.

By opening the electric clutch, the input shaft of the transmission pump may be coupled to the engine's output shaft, through a one-way clutch of the variable gearbox, at a second gear ratio, and the pump may be driven by the engine at a second speed ratio between the pump and the engine. As such, the pump may be driven by the engine at the second speed ratio even in the absence of variable gearbox assistance, as illustrated in graph 912, for example, during an engine start from a vehicle shut-down condition. The transmission pump may rotate faster relative to the engine at the first speed ratio as compared to the second speed ratio. Thus, by temporarily driving the transmission pump at the first speed ratio during an engine restart from idle-stop, transmission pump flow capacity may be increased even when the engine speed is low. Then, when the engine speed is higher, the speed ratio may be adjusted back to a second speed ratio.

In this way, a transmission hydraulic circuit comprising a mechanical transmission pump, coupled to (and driven by) an engine via a gearbox, may be pressurized, even at low engine speeds. By improving pump flow capacity at low engine speeds, hydraulic line pressure may be maintained prior to and at the onset of an engine restart operation, enabling a rapid re-engagement of transmission clutches (as desired) and a rapid vehicle re-launch when requested by the driver. By maintaining hydraulic line pressure by adjusting a variable gearbox, the need for auxiliary pumps may be reduced, thereby providing and component and cost savings, without affecting the quality of engine restarts.

In one embodiment, a method of controlling a vehicle system including an engine coupled to a transmission mechanical pump through a gearbox is provided. The method may comprise during a first engine restart from idle-stop condition, temporarily driving the pump at a first speed ratio between the engine and the pump before adjusting the first ratio to a second speed ratio, the pump rotating faster relative to the engine at the first speed ratio as compared to the second speed ratio; and during a second engine start from vehicle shut-down condition, driving the pump at the second speed ratio.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine driving a transmission fluid pump, comprising, during an engine start from an automatic idle stop, adjusting a speed ratio between the transmission fluid pump and the engine via a variable gearbox, the speed ratio adjusted between a first speed ratio and a second speed ratio, the transmission fluid pump rotating faster relative to the engine at the first speed ratio as compared with the second speed ratio, the variable gearbox coupling the engine to the transmission fluid pump, the variable gearbox including a first gearset coupled to a second gearset along a first path via a one-way clutch, the first gearset further coupled to the second gearset along a second path, parallel to the first path, via an electric clutch.

2. The method of claim 1, wherein the adjustment includes,
adjusting the electric clutch of the variable gearbox to couple the transmission fluid pump to the engine via the electric clutch and drive the transmission fluid pump at the first speed ratio when engine speed is below a threshold; and
adjusting the electric clutch of the variable gearbox to couple the transmission fluid pump to the engine via the one-way clutch and drive the pump at the second speed ratio when engine speed is above the threshold.

3. The method of claim 2, wherein the variable gearbox is a two-speed gearbox including one or more gearsets, and wherein adjusting the electric clutch includes, closing the electric clutch to drive the transmission fluid pump at the first speed ratio, and opening the electric clutch to drive the transmission fluid pump at the second speed ratio.

4. The method of claim 1, wherein adjusting the electric clutch includes opening the electric clutch and grounding a ring gear of a planetary gearset to drive the transmission fluid pump at the first speed ratio, and closing the electric clutch to drive the transmission fluid pump at the second speed ratio.

5. The method of claim 1, wherein the adjustment further includes driving the transmission fluid pump at the first speed ratio when a starter is engaged, and driving the transmission fluid pump at the second speed ratio when the starter is disengaged.

6. The method of claim 1, wherein the engine is automatically restarted during restart conditions.

7. A method of pressurizing a transmission hydraulic circuit including a transmission mechanical pump coupled to an engine through a gearbox, comprising,
during an automatic engine start from an automatic idle stop, driving the transmission mechanical pump with the engine via the gearbox at each of a first and second speed ratio between the transmission mechanical pump and the engine, the transmission mechanical pump rotating faster than the engine at the first speed ratio relative to the second speed ratio, the gearbox including an electric clutch, a one-way clutch, and a first gearset coupled to a second gearset along a first path via the one-way clutch, the first gearset further coupled to the second gearset along a second path, parallel to the first path, via the electric clutch; and
selecting between the first and second speed ratio in response to engine speed.

8. The method of claim 7, wherein the selection includes, driving the pump at the first speed ratio when the engine speed is below a threshold, and driving the pump at the second speed ratio when the engine speed is above the threshold.

9. The method of claim 8, wherein driving the pump at the first speed ratio includes closing the electric clutch and coupling the pump to the engine via the electric clutch, and wherein driving the pump at the second ratio includes opening the electric clutch and coupling the pump to the engine via the one-way clutch.

10. The method of claim 9, wherein the pump is coupled to a starter motor of the engine, and driving the pump at the first speed ratio includes closing the electric clutch to drive the pump using the starter motor, wherein the pump is a mechanical pump.

11. The method of claim 10, wherein driving the pump at the first speed ratio using the starter motor includes coupling the pump to the starter motor through a starter pinion gear.

* * * * *